(12) United States Patent
De Jong et al.

(10) Patent No.: US 12,717,550 B1
(45) Date of Patent: Aug. 25, 2026

(54) STATELESS CACHING FOR CODE GENERATION USING GENERATIVE ARTIFICIAL INTELLIGENCE

(71) Applicant: AUGMENT COMPUTING, INC., Palo Alto, CA (US)

(72) Inventors: Michiel Steven De Jong, Palo Alto, CA (US); Markus Norman Rabe, San Francisco, CA (US); Yuzhe Zhao, San Francisco, CA (US)

(73) Assignee: AUGMENT COMPUTING, INC, Palo Alto, CA (US)

( * ) Notice: Subject to any disclaimer, the term of this patent is extended or adjusted under 35 U.S.C. 154(b) by 300 days.

(21) Appl. No.: 18/640,386

(22) Filed: Apr. 19, 2024

Related U.S. Application Data

(60) Provisional application No. 63/587,251, filed on Oct. 2, 2023.

(51) Int. Cl.
*G06F 9/44* (2018.01)
*G06F 8/30* (2018.01)
*G06F 9/455* (2018.01)

(52) U.S. Cl.
CPC ............ *G06F 8/30* (2013.01); *G06F 9/45529* (2013.01)

(58) Field of Classification Search
CPC .............................. G06F 8/30; G06F 9/45529
See application file for complete search history.

(56) References Cited

U.S. PATENT DOCUMENTS

| | | | | |
|---|---|---|---|---|
| 12,014,155 | B2 * | 6/2024 | Athiwaratkun | G06F 8/33 |
| 12,424,119 | B1 * | 9/2025 | Lin | G06N 20/00 |
| 12,517,704 | B1 * | 1/2026 | Ostrovsky | G06F 8/30 |
| 2023/0359441 | A1 * | 11/2023 | Duan | G06N 3/084 |

* cited by examiner

*Primary Examiner* — Hang Pan

(57) ABSTRACT

Stateless caching for code generation using generative artificial intelligence ('AI'), including: receiving a sequence of input tokens that may include: a prefix comprising one or more input tokens occurring before a reference point in a computer program, a suffix occurring after the prefix in the sequence and comprising one or more input tokens occurring after the reference point in the computer program, and retrieved data occurring after the suffix in the sequence and comprising one or more input tokens based on information accessed from one or more data sources; loading a portion of an embedding of a previously received sequence corresponding to a leading portion of the previously received sequence that matches a leading portion of the sequence; and generating a prompt for suggested code to be inserted into the computer program at the reference point.

20 Claims, 6 Drawing Sheets

STATELESS CACHING FOR CODE GENERATION USING GENERATIVE ARTIFICIAL INTELLIGENCE

CROSS REFERENCE TO RELATED APPLICATION

This is a non-provisional application for patent entitled to a filing date and claiming the benefit of earlier-filed U.S. Provisional Patent Application No. 63/587,251, filed Oct. 2, 2023, herein incorporated by reference in its entirety.

DETAILED DESCRIPTION

The present disclosure relates to methods, products, apparatuses, and services for stateless caching for code generation using generative AI. Generative AI is a category of artificial intelligence that focuses on creating and generating new data, content, or information. Systems, software, and services that leverage generative AI (hereafter referred to as 'generative AI systems') may be able to produce outputs that resemble human-generated content, such as text, audio, and more, often enabled through the usage of deep learning techniques and neural networks. In one particular embodiment, generative AI systems may be able to produce computer program code (also referred to hereafter simply as 'code') in a variety of programming languages, as pseudocode, or in some other way.

Figure 1:
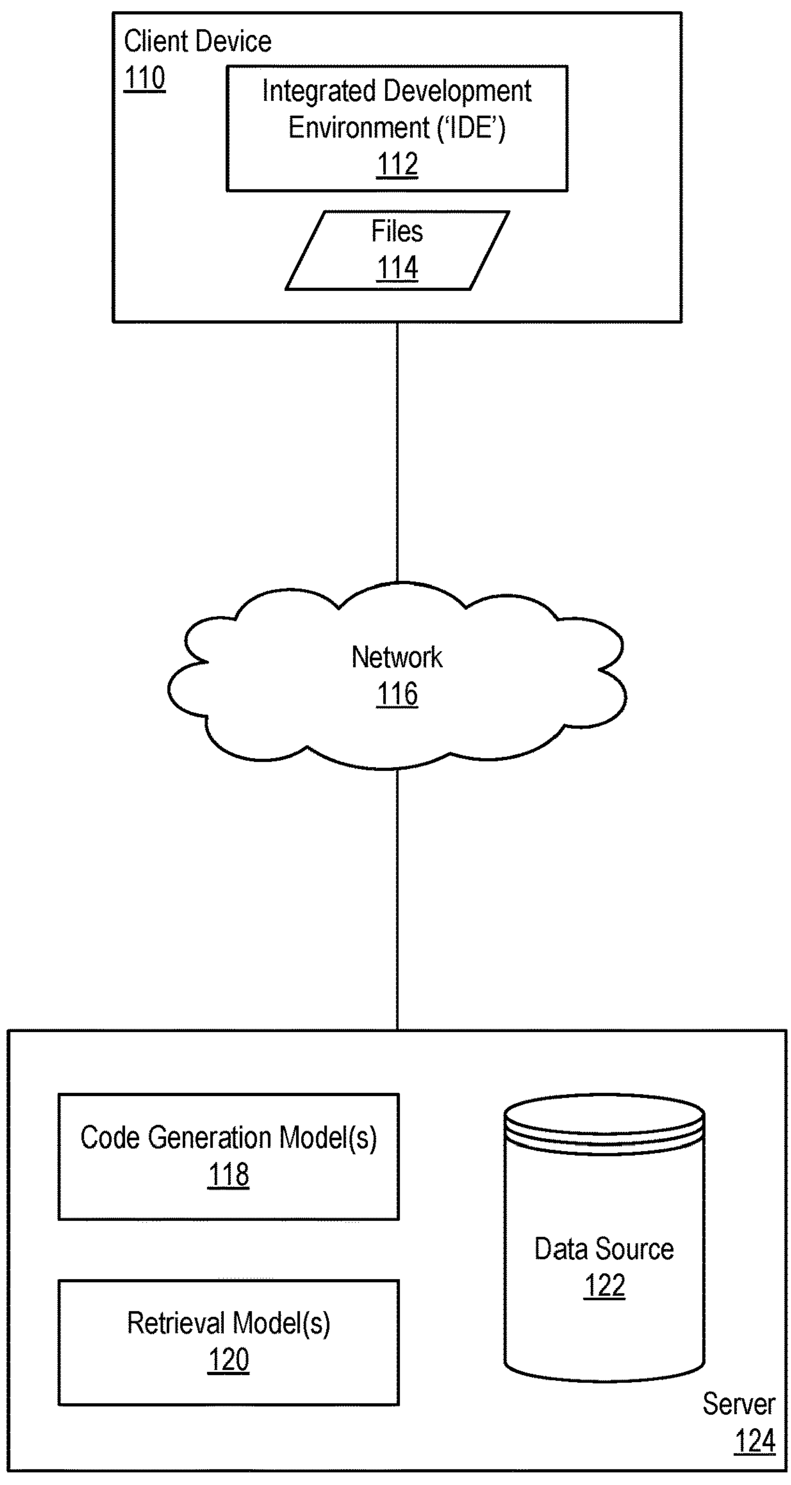
FIG. 1 a block diagram of an example system for stateless caching for code generation using generative artificial intelligence ('AI') in accordance with some embodiments of the present disclosure.

FIG. 1 is a block diagram of an example system in which one or more models are leveraged for enterprise specific code generation using generative AI. FIG. 1 includes a client device 110 and a server 124 that are connected via a network 116. The network 116 depicted in FIG. 1 may be embodied, for example, as a system (including a collection of networking devices, data communications links, and so on) that enables the exchange of digital information between multiple devices (e.g., endpoints), where in this embodiment those devices or endpoints include the client device 110 and the server 124. The network 116 may leverage physical or wireless medium to carry data between nodes using one or more data communications protocols. Such data communications protocols may include the rules and conventions that govern how data is formatted, transmitted, and received within the network 116. Such protocols can include, for example, TCP/IP, HTTP, SMTP, cellular protocols, and many others. Such a network 116 may be embodied as, for example, a Local Area Network ('LAN') that covers a small geographical area, a Wide Area Network ('WAN') that spans larger regions, a Virtual Private Network ('VPN') that uses encryption to create secure and private communication channels, the internet, or in some other way.

The client device 110 depicted in FIG. 1 may be embodied, for example, as a computer, smartphone, tablet, or other computing device that accesses and utilizes services provided by the server 124. The client device 110 will be described in greater detail herein, but the client device 110 may also include one or more applications or user interfaces that allows users of the client device 110 to interact with the server 124, one or more modules of software and hardware that enable the client device 110 to communicate with the server 124 by sending messages, packets, and the like to the server 124, various hardware components such as computer processors, memory, storage, networking interfaces, and much more. The client device 110 may also include one or more displays (e.g., a connected monitor, a touchscreen) and one or more user input devices (e.g., a keyboard, a mouse, a touchscreen) that enable users of the client device 110 to interact with the client device 110.

In the example depicted in FIG. 1, the client device 110 includes an integrated development environment ('IDE') 112. The IDE 112 may be embodied, for example, as a software application that provides an integrated set of tools and features to streamline the software development process. IDEs 112 may be used by developers to write, test, and debug code more efficiently, and may include features to support software development tasks such as coding, debugging, and project management. Examples of IDEs 112 that may be supported by the client device 110 can include, for example, Visual Studio, IntelliJ IDEA, Eclipse, NetBeans, PyCharm, and many others. The particular IDE 112 that is leveraged may depend on the programming language and platform being used.

In the example depicted in FIG. 1, the IDE 112 can include (amongst other modules and features) a code editor, which may be embodied as an interface that is used by a software developer to write, edit, and view source code. The editor may include features like syntax highlighting, code formatting to enhance code readability, and code completion features that may be augmented by interactions with the server 124 as described in greater detail herein.

In the example depicted in FIG. 1, the IDE 112 (or some other tool) may be used to access and/or manage one or more files 114. The one or more files 114 can include, for example, source code files that contain the instructions and logic for the software being developed (written in Java, Python, C++, or some other programming language), header files or other library files, configuration files which may specify settings and parameters for the application being developed, template files, script files, documentation files, configuration files for the IDE 112, and many others.

The server 124 depicted in FIG. 1 may be embodied, for example, as one or more computers (although in other embodiments the server 124 may be embodied as one or more hosted application(s)) that provides services, resources, or data to one or more client devices 110 over a network 116. The server 124 may include dedicated hardware systems designed to handle heavy workloads and ensure reliability, although in other embodiments the server 124 may be implemented through software on standard computers. Specialized server operating systems and software may even be used to optimize performance, security, or for some other purpose.

The server 124 depicted in FIG. 1 includes one or more code generation model(s) 118. The code generation model(s) 118 depicted in FIG. 1 may be embodied, for example, as one or more machine learning models designed to generate executable source code for various programming tasks. The code generation model(s) 118 may utilize natural language processing and machine learning techniques to understand and generate code in programming languages like Python, JavaScript, Java, C-based languages, and others. The code generation model(s) 118 may leverage deep learning architectures, such as recurrent neural networks (RNNs), transformers, or hybrid models that combine convolutional and recurrent layers.

In the examples depicted in FIG. 1, the code generation model(s) 118 may be configured to generate enterprise specific code. In other embodiments, the generated code may not be 'enterprise' specific but may be specific to some other group of users, some other entity that has associated computer code, or any other entity. In some embodiments, the code generation model(s) 118 generate enterprise (or entity) specific code, for example, in the sense that the code generation model(s) 118 are trained on code for a particular enterprise (e.g., a particular business organization, a particular business unit within a particular business organization) or entity, in the sense that code generation model(s) 118 leverage a knowledge base that is specific to some particular enterprise or entity (e.g., the enterprise's code base), or in some other way. As such, the code generation model(s) 118 depicted here may produce output that is tailored for a specific enterprise or entity as it adheres to their standards, leverages their code base, is written in their same style, and so on.

The code generation model(s) 118 depicted in FIG. 1 may be configured to consider the context in which the code is generated, as the code generation model(s) 118 can take into account any surrounding code or variables that may influence the code generation process. The code generation model(s) 118 may be used for code completion tasks where the code generation model(s) 118 are used to assist developers by providing code completion suggestions as the developer writes code. That is, the code generation model(s) 118 may (via the IDE 112) be provided with information describing where a user's cursor is positioned within a code editor, what code precedes the cursor, what code follows the cursor, and so on, as inputs to code completion process.

In the example depicted in FIG. 1, the server 124 can also include one or more retrieval model(s) 120. The retrieval model(s) 120 depicted in FIG. 1 may be embodied, for example, as machine learning models used for generating responses or recommendations based on retrieving and selecting relevant pre-existing content from a database or knowledge base (depicted herein as data source 122). The retrieval model(s) 120 may therefore leverage existing data or content to provide responses that are contextually appropriate and accurate. Such retrieval model(s) 120 may therefore rely on a database or knowledge base that contains a pre-existing data that serves as a source of information for generating responses. In FIG. 1, the retrieval model(s) 120 rely on information in the depicted data source 122, where the data source 122 can include, for example, a code repository associated with a particular enterprise or entity, documentation associated with the code base, and other information that is relevant to code that has been developed by the particular enterprise or entity.

In the example depicted in FIG. 1, the retrieval model(s) 120 may leverage various techniques such as, for example, feature extraction to identify meaningful features from content in the enterprise's code repository and code in the code editor of the IDE 112, similarity scoring or similar techniques to measure similarity between code in the code editor of the IDE 112 and the content in the data source 122, content ranking and selection, and so on. Such retrieval model(s) 120 may, in some embodiments, be combined with generative models (e.g., the code generation model(s) 120) to create hybrid models that leverages the strengths of both retrieval and generative models to produce more contextually relevant code completion recommendations.

In some embodiments, the retrieval model(s) 120 may be configured to generate precomputed latent representations of stored code (e.g., the code in a particular code base). The latent representation may be embodied, for example, as a floating-point value that captures relevant information about the stored code. Such features may not be directly observed or defined, but instead may be learned by the retrieval model(s) 120 from the raw input data (in this case the stored code). Such latent representations may be made available to the code generation model(s) 118 instead of (or in addition to) the textual representation of the stored code. In such a way, the latent representation may be further processed to encode additional context, deeper understanding, and interconnection with other memories. Furthermore, the systems described herein may refine the latent representations asynchronously and offline (i.e., separately from the process of the code generation model(s) 118 generating code).

In some embodiments, the retrieval model(s) 120 can be enhanced using static analysis of code. Such a process may, in some embodiments, involve statically analyzing existing code (i.e., code from a user's code base) to pick out some fill-in-the-middle ('FIM') examples. For example, the retrieval model(s) 120 may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models used by generative AI systems that can do FIM for computer program code. In these embodiments, models are trained, and training sets are generated to cover sampling at multiple levels of hierarchy (parenthesis, functions, class, etc . . . ). The training sets are also created with a distribution that is similar to a distribution that would be similar to a user's knowledge base (i.e., their code repository) so that models behave in accordance with the appropriate distribution.

Readers will appreciate that because each client device 110 has its own set of files 114, a software developer using a first client device may have a different set of files than a client software developer using a second client device. For example, the software developer using a first client device may update some function in a particular file, but without actually committing the updated file to a shared codebase (which may involve rounds of review or other version control procedures), the software developer using a second client device may not have access to the updated function in the particular file. As such, it is not abnormal for users of different client devices to have different versions of a shared codebase.

Readers will further appreciate that because each client device 110 can upload its local files to the server 124, the server 124 may generate different code completion recommendations for a user on a first client device 110 that has a first version of a particular file 114 than it would generate for a user on a second client device 110 that has a second version of a particular files 114, given that the different versions of the particular file 114 could result in different input tokens being sent to the code generation model(s) 118 and/or the retrieval model(s) 120. Readers will appreciate that although some files 114 may be distinct between a first client device and a second client device, some other files 114 may be identical (especially for two developers that are working on the same codebase). As such, and to avoid costly duplication, files (or portions thereof) may be deduplicated so that files (or portions thereof) that are common across multiple client devices 110 are only stored once by the server 124.

Figure 2:
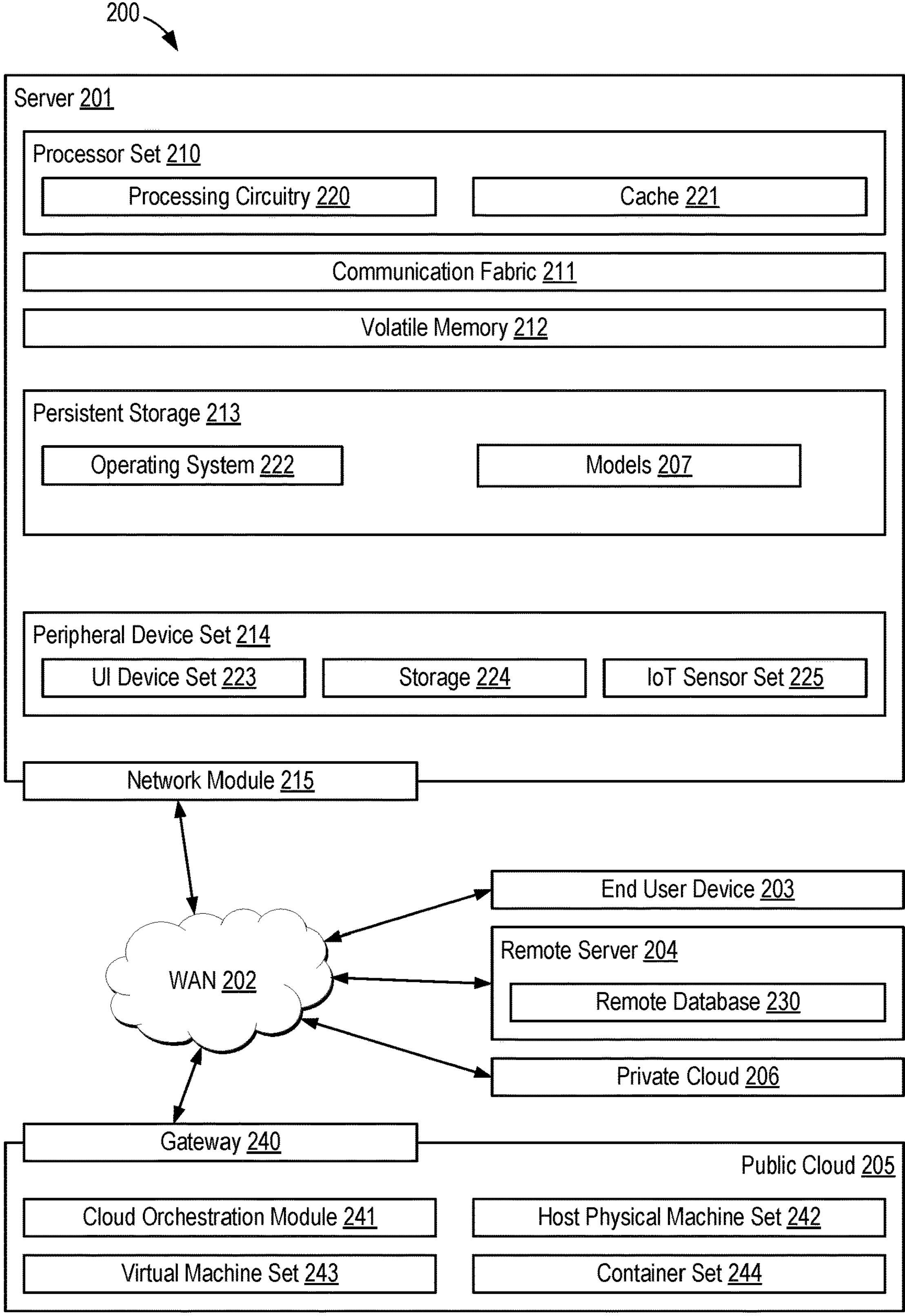
FIG. 2 sets forth a block diagram of an example computing environment configured for stateless caching for code generation using generative AI in accordance with some embodiments of the present disclosure.

For further explanation, FIG. 2 sets forth a block diagram of an example computing environment 200 configured for enterprise specific code generation using generative AI in accordance with some embodiments of the present disclosure. Computing environment 200 contains an example of an environment for the execution of at least some of the computer code involved in performing the inventive methods, such as various models 207 that may correspond to the models described in FIG. 1 and elsewhere in the present disclosure. In addition to models 207, computing environment 200 includes, for example, computer 201, wide area network ('WAN') 202, end user device ('EUD') 203 that may be similar to the client device of FIG. 1, remote server 204, public cloud 205, and private cloud 206. In this example embodiment, computer 201 includes processor set 210 (including processing circuitry 220 and cache 221), communication fabric 211, volatile memory 212, persistent storage 213 (including operating system 222 and models 207), peripheral device set 214 (including user interface ('UI') device set 223, storage 224, and Internet of Things ('IoT') sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in models 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open-source Portable Operating System Interface-type operating systems that employ a kernel. The models 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network ('SAN') that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks ('LANs') designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device ('EUD') 203 is any computer system that is used and controlled by an end user (for example, a customer of an enterprise that operates computer 201), and may take any of the forms discussed above in connection with computer 201. In some embodiments, the EUD 203 may perform all of the functions of the client device of FIG. 1 and may include the IDE and other components described with reference to FIG. 1 and elsewhere in the present disclosure. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments ('VCEs') typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments ('VCEs') will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
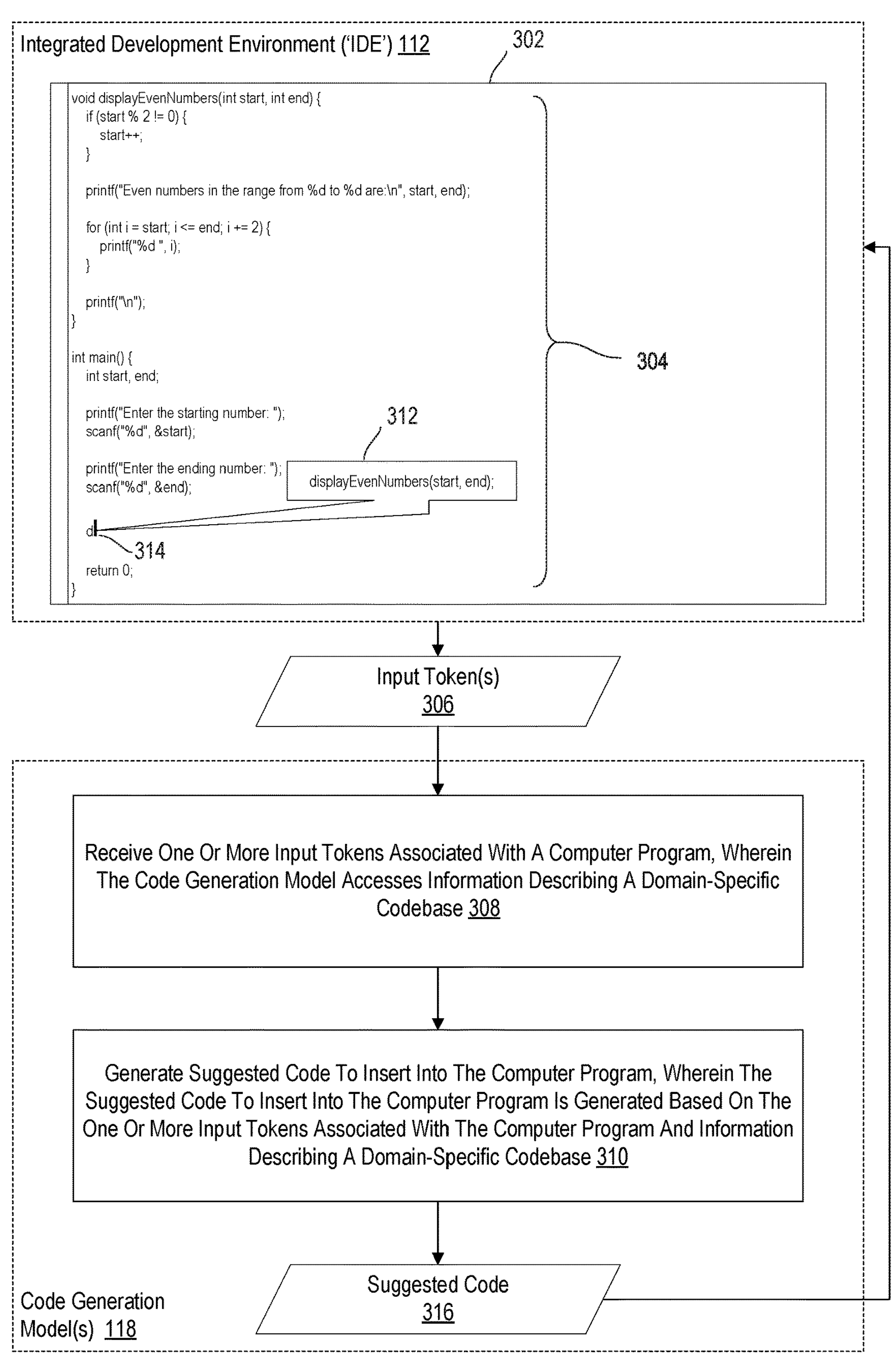
FIG. 3 sets forth a flow chart illustrating an example method of enterprise specific code generation using generative AI in accordance with some embodiments of the present disclosure.

For further explanation, FIG. 3 sets forth a flow chart illustrating an example method of enterprise specific code generation using generative AI in accordance with some embodiments of the present disclosure. The example method depicted in FIG. 3 includes one or more code generation model(s) 118 and an IDE 112 as described elsewhere in the present disclosure.

In the example depicted in FIG. 3, the IDE 112 includes a code editor 302, where a computer program 304 that displays even numbers between two input parameters. In this example, the computer program 304 is intended to be depicted as being in draft, with a software developer drafting code that is included in the computer program 304. More specifically, the software developer's cursor 314 is depicted near the bottom of the computer program 304, as the developer is writing a line of code that begins with the letter "d" followed by the cursor 314. In this example, the code editor 302 is depicted as displaying a recommended code completion 312 that is generated as will be described in greater detail below. The recommended code completion 312 includes a function call to the displayEventNumbers function that is defined in the code editor 302. Readers will appreciate that this example is purposefully intended to be quite simple for ease of explanation, but in other embodiments the recommended code completion 312 may be far more complex, may be presented in other ways, and so on. In fact, although this embodiment illustrates an example in which recommended code completions 312 are presented to a software developer via an IDE 112, in other embodiments the systems, methods, products, modules, or components described herein may be used to automatically generate entire software applications, functions, and so on.

The example method depicted in FIG. 3 includes receiving 308, by a code generation model 118, one or more input tokens 306 associated with a computer program 304. The one or more input tokens 306 may be discrete units of information (e.g., text, some representation of text such as a hash of the text) that are used to as input to the code generation model(s) 118. For example, a first token may include some representation of the text that precedes the location of the cursor 314 in the computer program 304, a second token may include some representation of text that follows the location of the cursor 314, and so on. In fact, many tokens may be generated that represent different portions of the text that precedes the location of the cursor 314, different portions of the text that follows the location of the cursor 314, representations of portions of documentation associated with the computer program 304, representations of libraries that are utilized by the computer program 304, representations infrastructure-as-code ('IaC') templates for the environment that executes the computer program 304, and so on. In such a way, the tokens can essentially represent the state of the computer program 304 that is being developed.

Readers will appreciate that the input tokens 306 can essentially guide the behavior of the code generation model(s) 118 and can be important inputs that drive the output of the code generation model(s) 118. Each input token 306 may be part of a sequence of input tokens 306 that collectively form the input to the code generation model(s) 118. Readers will appreciate that input tokens 306 can be of differing types that may determine how the code generation model(s) 118 interprets and processes each particular input token 306. Readers will further appreciate that the position of each input token 306 in the input sequence signifies the order or context in which the input token 306 appears, as the preceding and following input tokens 306 in the input sequence provides context for a particular input token 306. In such a way, the context helps the code generation model(s) 118 understand the relationships and dependencies between various input tokens 306, thereby helping the code generation model(s) 118 generate accurate and contextually relevant suggested code 316 that can ultimately be presented as a recommended code completion 312 or leveraged in some other way. The input tokens 306 may be generated by the IDE 112 or some other module performing a variety of steps, including preprocessing steps to clean and structure the code data. This process may involve performing tokenization steps, separating code into individual tokens (e.g., keywords, operators, identifiers), removing irrelevant or sensitive information, and performing other preprocessing steps to generate the input tokens 306.

In the example method depicted in FIG. 3, the one or more input tokens 306 associated with the computer program 304 may be generated by the IDE 112, by a plug-in or extension for the IDE 112, by some other module that is accessible by the IDE 112, or by some other intervening module between the IDE 112 and the code generation model(s) 118. The one or more input tokens 306 associated with the computer program 304 may be received 308 by the code generation model(s) 118, for example, via one or more messages that are received by the code generation model(s) 118, via one or more queues or other data structure that the IDE 112 inserts input tokens 306 into and that the code generation model(s) 118 retrieves input tokens 306 from, via the IDE 112 directly writing (e.g., via an RDMA or RDMA-like operation) the input tokens 306 into memory on server (124 in FIG. 1) that supports the execution of the code generation model(s) 118, or in some other way.

In the example method depicted in FIG. 3, the code generation model 118 may access information describing a domain-specific codebase. The domain-specific codebase may be embodied, for example, as the codebase for a particular business enterprise, as the codebase for a particular business unit within a business enterprise, as the codebase for some collection of software developers, as the codebase for some other entity, and so on. The information describing a domain-specific codebase can also include non-code information such as, for example, documentation associated with a code base, commit histories for code in the code base, information describing an environment some software in the code base will be executed, information describing support tickets for code in the code base, information describing bugs in the code base and their resolution, information describing whether some code was generated by a human developer or generative AI, information identifying which particular software developer wrote some code in the code base, performance information gathered during execution of some code in the code base, environmental information (e.g., schemas in a data warehouse that contains data to be used by the code, cloud infrastructure layout, Remote Procedure Call ('RPC') endpoint configurations) describing the environment that code will be executed in, infrastructure information (e.g., information about a Kubernetes pods that may be running, information about the cloud infrastructure) describing the environment that code will be executed in, and so on. The information describing a domain-specific codebase may be embodied, for example, as the data source (122 of FIG. 1) depicted in FIG. 1. Such information may be inserted into the generated code, used to drive some query, or otherwise used by one or more of the models.

In some embodiments, the code generation model(s) 118 may access information describing a domain-specific codebase, for example, by receiving information from a knowledge base that includes code in the domain-specific codebase. Such information may be received from a trained retrieval model (such as the trained retrieval model(s) 120 depicted in FIG. 1). In some embodiments, the retrieval model(s) may be distinct from the code generation model(s) 118, the retrieval model(s) may be trained on a different training set than the code generation model(s) 118, and so on. In some embodiments, multiple retrieval models may be trained to do the retrieval. These retrieval models may be used, for example, to look at a piece of code (i.e., code that is being written by a developer), compare it to some other code/search the knowledge base for the most relevant piece of code, and then present that relevant piece of code to the developer or to another model. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

In some embodiments, the code generation model(s) 118 may access information describing a domain-specific codebase by retrieving, from a database that includes memories generated by examining the domain-specific codebase, one or more memories. In some embodiments one or more models are trained to store a memory corresponding to each of a plurality of tokens in a database. In such embodiments, models trained to store memories are trained from a corpus of words obtained from a specific enterprise (e.g., a domain or an entity), allowing the memories to reflect contextual information about usage of tokens in the specific enterprise. By using enterprise-specific information to generate memories for tokens, the model is able to account for a specific implementation environment and leverage preferences or criteria specific to the specific domain. For example, a code generation model 118 may be configured to leverage memories when generating suggested code 316 to insert into the computer program 304, where the memories account for coding preferences or specific libraries particular to an enterprise, such as an entity or an organization. This allows different enterprises to use a code constructs, functions, words, or other elements in a computer program in different ways or in different contexts, with the memories generated by the trained model accounting for the enterprise specific usage. In such a way, memories allow the code generation model(s) 118 to provide suggested code 316 that are tailored to the enterprise.

The example method depicted in FIG. 3 also includes generating 310, by the code generation model(s) 118, suggested code 316 to insert into the computer program 304. In the example method depicted in FIG. 3, the suggested code 316 to insert into the computer program 304 is generated based on the one or more input tokens 306 associated with the computer program 304 and information describing a domain-specific codebase.

The code generation model(s) 118 may generate 310 suggested code 316 to insert into the computer program 304, for example, by receiving an initial code snippet (or even a natural language description of a code) in the form of input tokens 306 and predicting the next token in the sequence (or intervening token when the input tokens 306 include tokens before and after a cursor or other reference point). In such an example, the code generation model(s) 118 may generate 310 suggested code 316 in the form of tokens that are generated one by one, taking into account the context provided by the preceding tokens. The code generation model(s) 118 may maintain an internal state that keeps track of the context of the code it is generating, where the context can include variables, function declarations, loops, conditionals, and other elements that are used to generate code that follows a logical and semantically correct structure. The code generation model(s) 118 may therefore be designed to understand and replicate the structure, syntax, and semantics of programming languages and computer programs that the code generation model(s) 118 can access, including those computer programs that are part of the domain-specific codebase. Readers will appreciate that the code generation model(s) 118 may generate code up to a specified length, until a specific stop token is reached, or in some other way.

Figure 4:
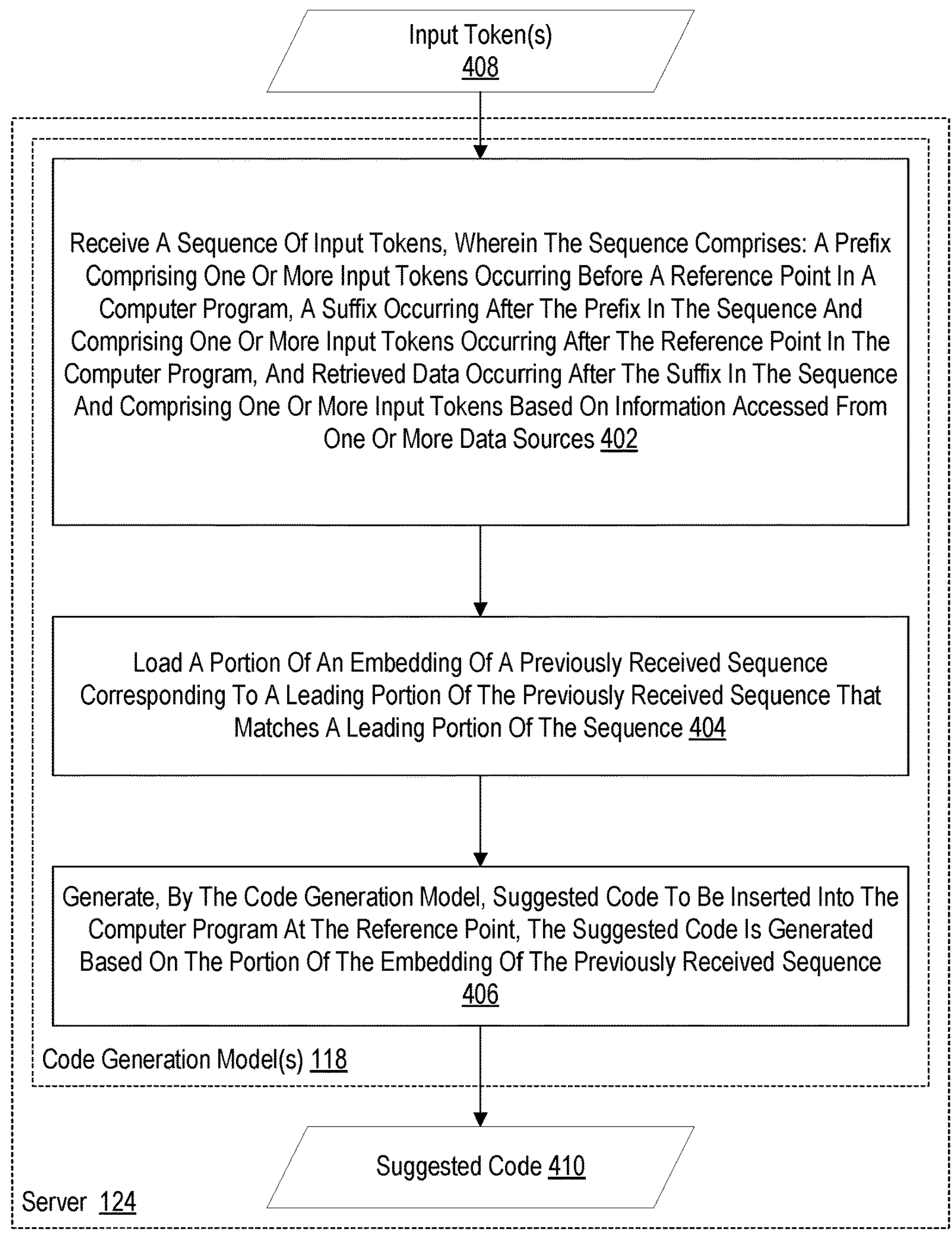
FIG. 4 sets forth a flow chart illustrating an example method of stateless caching for code generation using generative AI in accordance with some embodiments of the present disclosure.

For further explanation, FIG. 4 sets forth a flow chart illustrating an example method of stateless caching for code generation using generative AI in accordance with some embodiments of the present disclosure. The example method depicted in FIG. 4 includes a server 124 and one or more code generation model(s) 118 as described elsewhere in the present disclosure. In the example depicted in FIG. 4, assume that a user such as a software developer is drafting code for a computer program using an IDE 112 as described above. Particularly, during the drafting of some code, a cursor may be used to mark where input data, including user-input characters and suggested code 410 from the code generation model(s) may be inserted into the drafted code.

The example method depicted in FIG. 4 includes receiving 402 (e.g., by a code generation model 118) a sequence of input tokens 408, wherein the sequence comprises: a prefix comprising one or more input tokens 408 occurring before a reference point in a computer program, a suffix occurring after the prefix in the sequence and comprising one or more input tokens 408 occurring after the reference point in the computer program, and retrieved data occurring after the suffix in the sequence and comprising one or more input tokens 408 based on information accessed from one or more data sources. The sequence of input tokens 408 request for suggested code 410 may be received 402 as part of or in response to a request for the code generation model(s) 118 to produce some suggested code 410 for insertion into the computer program at the reference point. Here, the reference point may include the position of the cursor but may also include some other reference point as can be appreciated.

The one or more input tokens 408 may be discrete units of information (e.g., text, some representation of text such as a hash of the text) that are used to as input to or to generate input for the code generation model(s) 118. For example, as will be described in further detail below, one or more of the tokens may include some representation of the text that precedes the location of the cursor in the computer program, another one or more of the tokens may include some representation of text that follows the location of the cursor, and so on. As another example, one or more of the tokens may include representations of data accessed from other data sources using the retrieval models 120 described above (e.g., representations of portions of documentation associated with the computer program, representations of libraries that are utilized by the computer program, representations of some code base associated with the computer program, and the like).

In some embodiments, the one or more input tokens 408 may be received from some other entity, such as the IDE and/or the retrieval models 120, or some intermediary entity or module as can be appreciated. For example, the IDE may select some portion of text before and/or after the cursor and apply tokenization techniques to the selected text in order to generate a subset of the input tokens 408 for inclusion in response to a request for the code generation model(s) 118 to generate the suggested code 410. These input tokens 408 may then be used by the retrieval models 120 to retrieve additional data that may then be tokenized to generate additional input tokens 408 for the sequence. In some embodiments, data from which the one or more input tokens 408 may be generated may instead be received from these entities and tokenized in order to generate the sequence of input token 408.

The sequence of input tokens 408 will be used to drive the output of the code generation model(s) 118. Particularly, input tokens 408 representing code before and/or after the reference point (e.g., the cursor) are used to describe the context into which the suggested code 410 will be inserted while the input tokens 408 representing data from other data sources serve to provide additional context and examples of relevant code that may be used by the code generation model(s) 118 to generate the suggested code 410. Readers will appreciate that the order of the input tokens 408 in the sequence representing code before and/or after the reference point indicates the order in which those tokens, or the data from which those tokens are derived, occur in the computer program either before or after the reference point. Moreover, the order of the input tokens 408 in the sequence representing the information accessed from other data sources signifies the order in which those tokens, or the data from which those tokens are derived, occur in their respective data sources. This further provides context to the code generation model(s) 118 in order to generate accurate and contextually relevant suggested code 410.

As will be described in further detail below, the code generation model(s) 118 may generate an embedding of the input tokens 408 in order to generate the suggested code 410. An embedding is a numerical representation of some data, such as a vector embedding or other embedding as can be appreciated. An embedding of a sequence of input tokens 408 includes embeddings for each individual input token 408 in the sequence. The embedding for a particular token 408 may be based on not only the content of the token itself but also the preceding tokens in the sequence so as to reflect the context of that token in the overall sequence of input tokens 408. Readers will appreciate that, by virtue of causal attention, the embedding for a given input token 408 can be based on the embeddings of previous, but not later, input tokens 408 in the sequence.

As was set forth above, the sequence of input tokens 408 includes a particular ordering of input tokens 408 for input tokens 408 that occur before and after the reference point and for those based on information accessed from the other data sources. This particular ordering will be relevant when loading portions of previously generated embeddings, as will be described in further detail below. Here, the beginning of the sequence includes one or more input tokens 408 occurring before the reference point in the computer program (e.g., a "prefix"). In some embodiments, the prefix may include some number of tokens occurring at any point prior to the reference point.

In some embodiments, the prefix may be some number of tokens occurring before an offset occurring before the reference point (e.g., a "far prefix"). The offset is some number of tokens before the reference point marking the separation between the far prefix and a "near prefix" including those tokens occurring after the offset and before the reference point. Thus, the near prefix includes some number of tokens before and closest to the reference point while the far prefix includes some number of tokens before the reference point and further from the reference point than the near prefix. Here, the near and far prefix, in combination, may represent a continuous portion data in the computer program occurring before and adjacent to the reference point.

In some embodiments, the number of tokens to include in the near prefix and the far prefix may be based on some maximum number of tokens (e.g., one thousand or some other number). In some embodiments, the beginning of each of the near prefix and the far prefix may be based on a fixed sized token interval (e.g., fifty tokens or some other number). In some embodiments, measurement of the fixed size token interval may begin from the beginning of the computer program. As an example, assume a maximum number of tokens in the near and far prefix of one thousand. Further assume that the reference point is located five-hundred-and-thirty tokens away from the beginning of the program. Here, the far prefix may begin at the beginning of the program (e.g., at token zero) as the total number of tokens before the reference point is less than one thousand. As another example, assume instead that the reference point is located one-thousand-forty tokens away from the beginning of the program. In this example, the far prefix may begin at token fifty as it is an increment of the fixed size token interval (e.g., a multiple of fifty) and the total number of tokens between the beginning of the far prefix and the reference point will be less than the maximum of one thousand tokens. In some embodiments, the offset may include the last increment of the fixed size token interval occurring before the reference point. Returning to the examples above, where the reference point is located at token five-hundred-and-thirty, the offset may occur at token five hundred, while the offset may occur at token one thousand where the reference point is located at token one-thousand-and-forty. Readers will appreciate that the maximum token size and the fixed size token interval may vary according to particular design and engineering considerations.

Thus, the sequence of input tokens 408 may include, at the beginning, the far prefix. The suffix (e.g., input tokens 408 occurring after the reference point) occurs sequentially after the far prefix in the sequence. Sequentially after the suffix are the input tokens 408 for retrieved data (e.g., input tokens 408 based on information accessed from one or more data sources), followed by the near prefix. As will be described in further detail below, the near prefix occurs at the end of the sequence as the near prefix may change most frequently with respect to requests for suggested code 410.

The method of FIG. 4 also includes loading 404 a portion of an embedding of a previously received sequence corresponding to a leading portion of the previously received sequence that matches a leading portion of the sequence. As is described above, an embedding for a sequence of input tokens 408 may be generated by generating embeddings for each input token 408, with the embedding for a given input token 408 based on prior, but not later, tokens in the sequence. Where some leading portion of input token 408 sequences match, the embeddings for those matching input tokens 408 will also match. Accordingly, rather than recompute the embeddings for those matching input tokens 408 (e.g., the matching portions of the sequence), the code generation model(s) 118 may load and reuse embeddings for the matching portions, saving on computational resources in generating embeddings for model inputs and improving overall response times for the code generation model(s) 118. These approaches for ordering input tokens to maximize the reuse of previously generated embeddings without knowledge of prior prompts may be hereinafter referred to as "stateless caching."

As a simplified example, assume that a received sequence of input tokens 408 includes tokens A, B, C, D, and E. Further assume that the code generation model(s) 118 had previously calculated an embedding for a sequence of tokens A, B, C, F, and G. Here, the portions of the sequences for tokens A, B, and C match. Accordingly, the embeddings for tokens A, B, and C may be reused by the code generation model 118, eliminating their need to be recalculated. As will be described in further detail below, this partial embedding may then be used to calculate the embeddings for tokens D and E, thereby calculating the embedding for the received sequence of input tokens 408.

As another example, assume that a received sequence of input tokens 408 includes tokens A, B, C, D, and E while an embedding for a previously received sequence of input tokens H, B, C, D, and G had previously been generated by the code generation model(s) 118. This may be due, for example, due to the far prefix being realigned to start from a new interval due to a number of tokens being added to the computer program. Here, none of the embedding for previously received sequence can be loaded and reused as the two sequences differ at the beginning, causing cascading differences in their respective embeddings despite having some shared number of input tokens 408.

The ordering of the input tokens 408 in the sequences provides particular advantages in this approach for stateless caching. As a user enters data (e.g., tokenizable data) into the computer program, the IDE 112 may periodically generate requests for suggested code 410 from the code generation model(s) 118. As the state of the computer program changes, the data retrieved by the retrieval models 120 may also change. Were the input tokens 408 for the retrieved data placed at the beginning of the sequence, this may introduce high variability in the leading portions of input token 408 sequences across requests, making it difficult or impossible to reuse the leading portions of the embeddings for those sequences.

Instead, the sequence described above places the far prefix at the beginning of the sequence and the suffix after the far prefix, each of which may have a reduced degree of variability across requests. For example, the far prefix may remain unchanged as new tokens are entered into the computer program provided that the total number of tokens in the near prefix falls below the fixed size token interval. Should that be exceeded, the beginning of the far prefix would shift to the next increment of the fixed size token interval, with the far prefix now including the tokens from the prior near prefix. As the near prefix may have the highest degree of variability, the near prefix may be positioned at the end of the sequence.

The method of FIG. 4 also includes generating 406, by the code generation model 118, suggested code 410 to be inserted into the computer program at the reference point, wherein the suggested code 410 is generated based on the portion of the embedding of the previously received sequence. Particularly, the code generation model 118 generates 406 the suggested code 410 using the embedding for the received sequence of input tokens 408 which itself includes the loaded portion of the embedding of the previously received sequence. Thus, the code generation model 118 may generate some portion of suggested code 410 based on the various received input tokens 408 according to similar approaches as are set forth above.

Readers will appreciate that the approaches set forth above for stateless caching reduce the computational load required in generating embeddings of input tokens 408 by reusing portions of previously generated embeddings, also increasing overall response time by the code generation model 118. The disclosed sequence of input tokens 408 from which embeddings may be generated places more variable input tokens 408 at the end of the sequence, increasing the likelihood that a match for some leading portion of a sequence may be reused by virtue of the reduced variability at the leading portion of the sequence.

Figure 5:
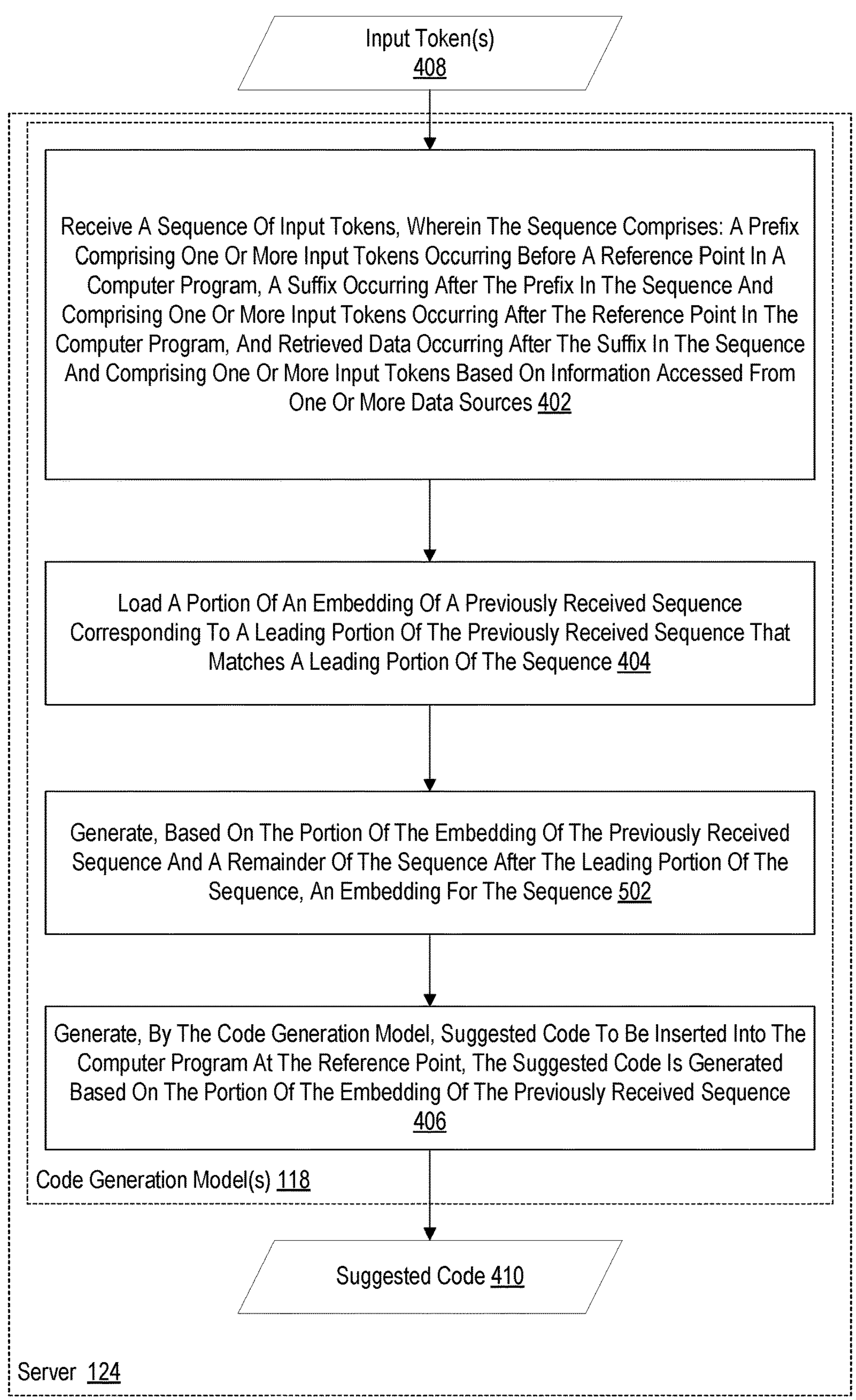
FIG. 5 sets forth a flow chart illustrating an additional example method of stateless caching for code generation using generative AI in accordance with some embodiments of the present disclosure.

For further explanation, FIG. 5 sets forth a flow chart illustrating an additional example method of stateless caching for code generation using generative artificial intelligence ('AI') in accordance with some embodiments of the present disclosure. The example method depicted in FIG. 5 is similar to the example method depicted in FIG. 4 in that it includes some of the same steps.

The example method depicted in FIG. 5 also includes generating 502, based on the portion of the embedding of the previously received sequence and a remainder of the sequence after the leading portion of the sequence, an embedding for the sequence. As is described above, the code generation model 118 generates an embedding for the received sequence of input tokens 408 as a whole in order to generate 406 the suggested code 410. As only a portion of the embedding of the previously received sequence may be loaded and reused in the embedding of the received sequence, a remainder of the embedding of the received sequence must be generated. For example, the loaded portion of the embedding of the previously received sequence may be used to generate an embedding for a first input token 408 in the received sequence that did not have a corresponding match in the previously received sequence. This process may then continue for the remainder of the input tokens 408 in the received sequence so as to generate the embedding for the received sequence.

Continuing with the example above, assume a receive sequence of input tokens 408 A, B, C, D, and E and a previously received sequence of input tokens 408 A, B, C, D, and E. The embeddings for input tokens 408 A, B, and C may be loaded and reused to generate the embedding for input token 408 D. The embeddings for input tokens 408 A, B, C, and D may then be used to generate the embeddings for input token 408 E. Thus, in order to generate the complete embedding for the received sequence, embeddings for only two input tokens 408 D and E need be generated.

Figure 6:
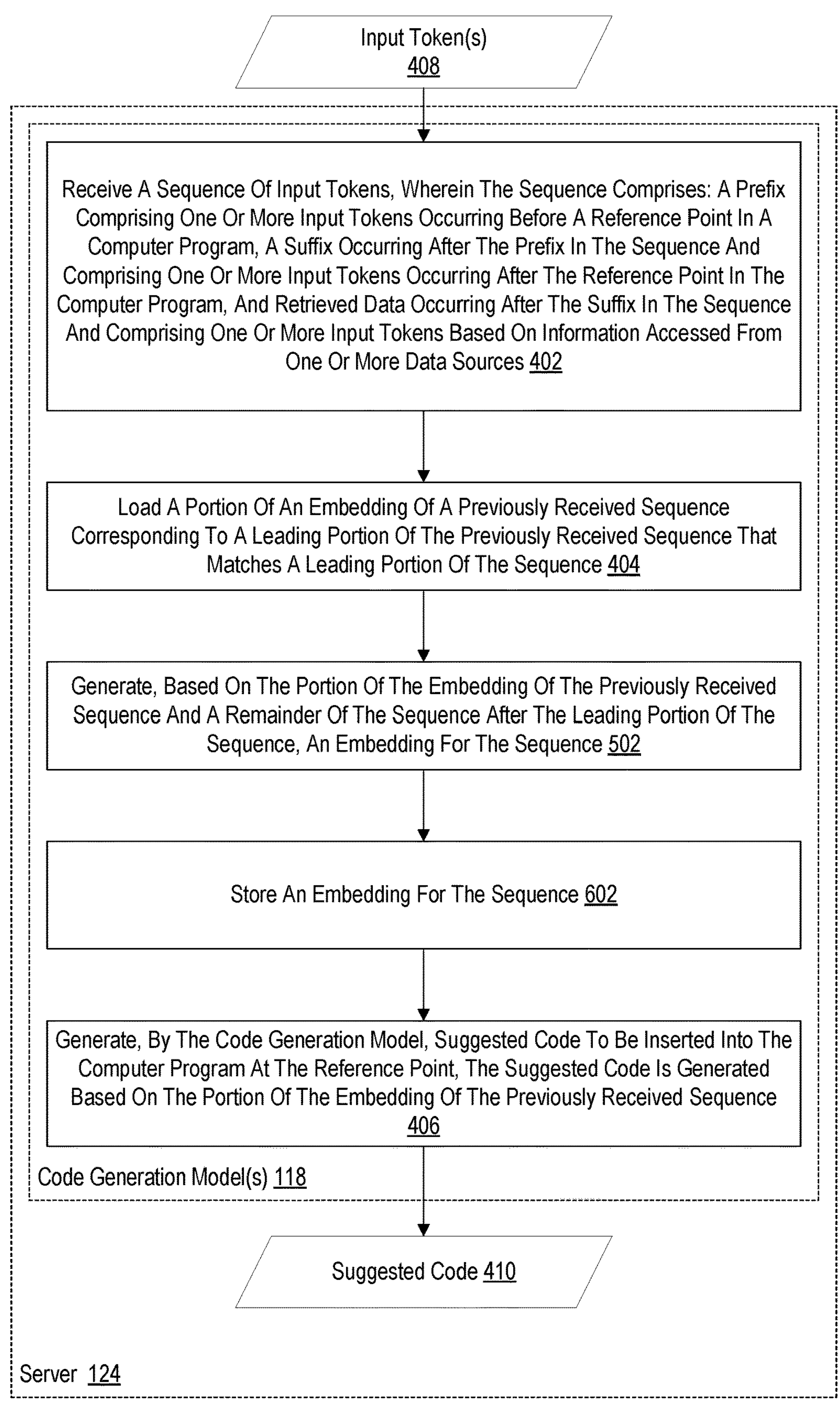
FIG. 6 sets forth a flow chart illustrating an additional example method of stateless caching for code generation using generative AI in accordance with some embodiments of the present disclosure.

For further explanation, FIG. 6 sets forth a flow chart illustrating an additional example method of stateless caching for code generation using generative artificial intelligence ('AI') in accordance with some embodiments of the present disclosure. The example method depicted in FIG. 6 is similar to the example method depicted in FIG. 4 and/or FIG. 5 in that it includes some of the same steps.

The method of FIG. 6 also includes storing 602 the embedding for the sequence. For example, the code generation model(s) 118 may store the embedding for the sequence (e.g., the received sequence of input tokens 408), allowing for portions of the embedding for the sequence to later be loaded and used for subsequently received sequences with matching leading portions of input tokens 408. In some embodiments, the code generation model(s) 118 may store, for example, a most recently generated embedding (e.g., for a most recently received or processed sequence of event tokens), or for potentially many previously generated embeddings.

The approaches set forth above may provide for improved matching for the far prefix and suffix portions of input token 408 sequences but may not necessarily improve matching the retrieved data portions. As the retrieved data portions may vary across requests (e.g., across sequences), it may be beneficial to improve matching those portions. Accordingly, in some embodiments, "append caching" may be implemented to improve the degree of matching between the retrieved data portions of sequences.

In append caching, rather than use input token 408 sequences having, in order, a far prefix, suffix, retrieved data, and near prefix, input to the code generation model 118 will instead include a defined a near prefix and a near suffix representing data near to the reference point and occurring before and after the reference point, respectively. The near prefix and near suffix will be encoded into the prompt after the remainder of the data to be encoded into the prompt. All other data encoded into the prompt (e.g., representing retrieved data and data that would otherwise be included in a far prefix or remainder of the suffix) will be encoded as groups or "chunks" of data. In some embodiments, such chunks of data may be annotated with metadata describing the origins of their stored encoded (e.g., where in the computer program or from what data source the encoded data was retrieved). In some embodiments, such chunks of data may be encoded as groups of tokens. In some embodiments, such chunks of data may be encoded as untokenized data that may be later tokenized in order to generate an embedding for the corresponding chunk for inclusion in a prompt. Thus, a prompt may be encoded using a collection of chunks followed by a near prefix and near suffix (e.g., by generating an embedding for the collection of chunks, the near prefix, and the near suffix).

Accordingly, in response to or as part of a request for suggested code 410 to be inserted into a computer program, a collection of chunks may be received as well as a near prefix and near suffix. For example, a portion of chunks or data that may be encoded into chunks may be received from an IDE. This received data may then be used by the retrieval model 120 to retrieve other chunks of data or data that may also be encoded into chunks.

A data structure may be maintained that associates previously received collections of chunks and their respective embeddings. In order to reuse a portion of an embedding of a previously received collection of chunks for a received collection of chunks, a particular collection of chunks may be identified from the data structure. In some embodiments, the particular collection of chunks may include a last received collection of chunks. In some embodiments, the particular collection of chunks may include a similar collection of chunks. For example, the particular collection of chunks may be identified as a collection of chunks in the data structure having a highest degree of similarity with respect to the received collection of chunks and/or having a degree of similarity exceeding some threshold.

In order to generate the input for the code generation model 118, those chunks present in the received collection of chunks may be effectively appended to the end of the particular collection of chunks loaded from the data structure. For example, the complete embedding for the particular collection of chunks may be used to generate a remainder of the embedding for the received collection of chunks using those chunks found in the received collection of chunks but not found in the particular collection of chunks.

For example, assume that a data structure stores an embedding for a previous collection of chunks A, C, and E and that a received collection of chunks includes chunks C, E, and G, the embedding for chunks A, C, and E may be loaded and used to generate an embedding for chunk G. Readers will appreciate that these embeddings may also be used to generate embeddings for the received near prefix and suffix when generating the overall embedding to be included in the prompt. Readers will also appreciate that the particular ordering of chunks does not matter in append caching. Continuing with the example above, instead assume that the received collection of chunks includes, in some received order, chunks E, C, and G. Here, even though chunks C and E occur in a different order across the collections of chunks, the previous embedding may nonetheless be reused as the inclusion of the chunks themselves is the determining factor in identifying a collection of chunks for append caching. In other words, the approaches described herein for append caching allow for caching all chunks in previous requests regardless of what order they occurred in the request.

Readers will appreciate that, using append caching, the resulting prompt may include data based on potentially irrelevant chunks (e.g., not included or associated with the original request) and that these chunks may not occur in a predictable order across requests. Accordingly, the code generation model 118 generate accurate and correct suggested code 410 insensitive to the order of the encoded chunks in the prompt and with the potential inclusion of irrelevant chunks. To do so, the code generation model 118 may be trained using various approaches to address these concerns.

In some embodiments, to facilitate the code generation model 118 generating code insensitive to the order of encoded chunks in the prompt, the code generation model 118 may be trained using training data based on chunks of various orders or sequences. For example, in some embodiments, for a given portion of training data based on some collection of chunks, multiple instances of training data may be generated from the given portion of training data by reordering the chunks encoded therein. For example, for a given portion of training data, related training data may be generated for each possible permutation of chunks. As another example, for a given portion of training data, some number of samples of related training data may be generated using randomly generated permutations of chunks or other permutations of chunks as can be appreciated.

In some embodiments, to facilitate the code generation model 118 generating code while taking into account the inclusion of potentially irrelevant chunks of data, training data may be generated that intentionally includes irrelevant chunks of data. For example, assuming a sample of training data selected as having relevant chunks of data and output, one or more portions of related training data may be generated by including irrelevant chunks of data instead of or in addition to the relevant chunks of data. In some embodiments, only this generated related training data may be used in training the code generation model 118. In some embodiments, both the related training data (e.g., including irrelevant chunks) and the original training data (e.g., excluding irrelevant chunks) may be used in combination when training the code generation model 118.

Although some embodiments are described largely in the context of a generative AI system, a server with generative AI capabilities, or in some other way, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:

receiving a sequence of input tokens, wherein the sequence comprises: a prefix comprising one or more input tokens occurring before a reference point in a computer program, a suffix occurring after the prefix in the sequence and comprising one or more input tokens occurring after the reference point in the computer program, and retrieved data occurring after the suffix in the sequence and comprising one or more input tokens based on information accessed from one or more data sources;

loading a portion of an embedding of a previously received sequence corresponding to a leading portion of the previously received sequence that matches a leading portion of the sequence; and generating, by a code generation model, suggested code to be inserted into the computer program at the reference point, wherein the suggested code is generated based on the portion of the embedding of the previously received sequence.

2. The method of claim 1 wherein the reference point comprises a cursor position.

3. The method of claim 1 wherein the prefix is a far prefix comprising one or more input tokens occurring before an offset occurring before the reference point and wherein the sequence further comprises a near prefix occurring after the retrieved data in the sequence and comprising one or more input tokens occurring after the offset and before the reference point.

4. The method of claim 3 wherein the far prefix and the near prefix each begin at a different increment of a fixed size token interval in the computer program.

5. The method of claim 1 wherein the code generation model maintains one or more previously generated embeddings.

6. The method of claim 1 further comprising:

generating, based on the portion of the embedding of the previously received sequence and a remainder of the sequence after the leading portion of the sequence, an embedding for the sequence.

7. The method of claim 6 further comprising storing the embedding for the sequence.

8. A non-transitory computer readable storage medium storing instructions which, when executed, cause a processing device to:

receive a sequence of input tokens, wherein the sequence comprises: a prefix comprising one or more input tokens occurring before a reference point in a computer program, a suffix occurring after the prefix in the sequence and comprising one or more input tokens occurring after the reference point in the computer program, and retrieved data occurring after the suffix in the sequence and comprising one or more input tokens based on information accessed from one or more data sources;

load a portion of an embedding of a previously received sequence corresponding to a leading portion of the previously received sequence that matches a leading portion of the sequence; and generate, by a code generation model, suggested code to be inserted into the computer program at the reference point, wherein the suggested code is generated based on the portion of the embedding of the previously received sequence.

9. The non-transitory computer readable storage medium of claim 8 wherein the reference point comprises a cursor position.

10. The non-transitory computer readable storage medium of claim 8 wherein the prefix is a far prefix comprising one or more input tokens occurring before an offset occurring before the reference point and wherein the sequence further comprises a near prefix occurring after the retrieved data in the sequence and comprising one or more input tokens occurring after the offset and before the reference point.

11. The non-transitory computer readable storage medium of claim 10 wherein the far prefix and the near prefix each begin at a different increment of a fixed size token interval in the computer program.

12. The non-transitory computer readable storage medium of claim 8 wherein the code generation model maintains one or more previously generated embeddings.

13. The non-transitory computer readable storage medium of claim 8 wherein the instructions, when executed, further cause the processing device to:

generate, based on the portion of the embedding of the previously received sequence and a remainder of the sequence after the leading portion of the sequence, an embedding for the sequence.

14. The non-transitory computer readable storage medium 13 wherein the instructions, when executed, further cause the processing device to store the embedding for the sequence.

15. A system comprising:

a memory;

a processing device, operatively coupled to the memory, the processing device configured to:

receive a sequence of input tokens, wherein the sequence comprises: a prefix comprising one or more input tokens occurring before a reference point in a computer program, a suffix occurring after the prefix in the sequence and comprising one or more input tokens occurring after the reference point in the computer program, and retrieved data occurring after the suffix in the sequence and comprising one or more input tokens based on information accessed from one or more data sources;

load a portion of an embedding of a previously received sequence corresponding to a leading portion of the previously received sequence that matches a leading portion of the sequence; and generate, by a code generation model, suggested code to be inserted into the computer program at the reference point, wherein the suggested code is generated based on the portion of the embedding of the previously received sequence.

16. The system of claim 15 wherein the reference point comprises a cursor position.

17. The system of claim 15 wherein the prefix is a far prefix comprising one or more input tokens occurring before an offset occurring before the reference point and wherein the sequence further comprises a near prefix occurring after the retrieved data in the sequence and comprising one or more input tokens occurring after the offset and before the reference point.

18. The system of claim 17 wherein the far prefix and the near prefix each begin at a different increment of a fixed size token interval in the computer program.

19. The system of claim 15 wherein the code generation model maintains one or more previously generated embeddings.

20. The system of claim 15 wherein the processing device is further configured to:

generate, based on the portion of the embedding of the previously received sequence and a remainder of the sequence after the leading portion of the sequence.

* * * * *